Figure 8:
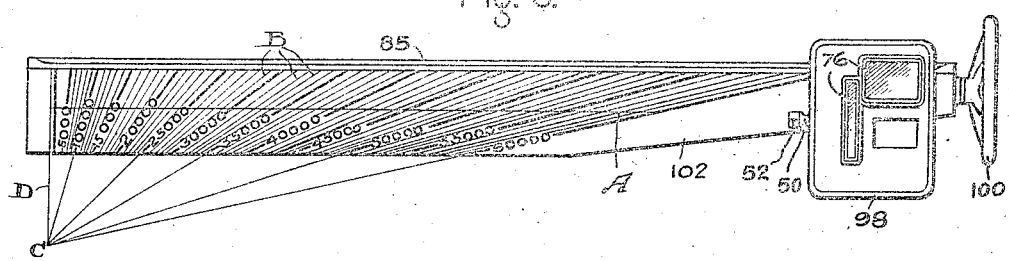

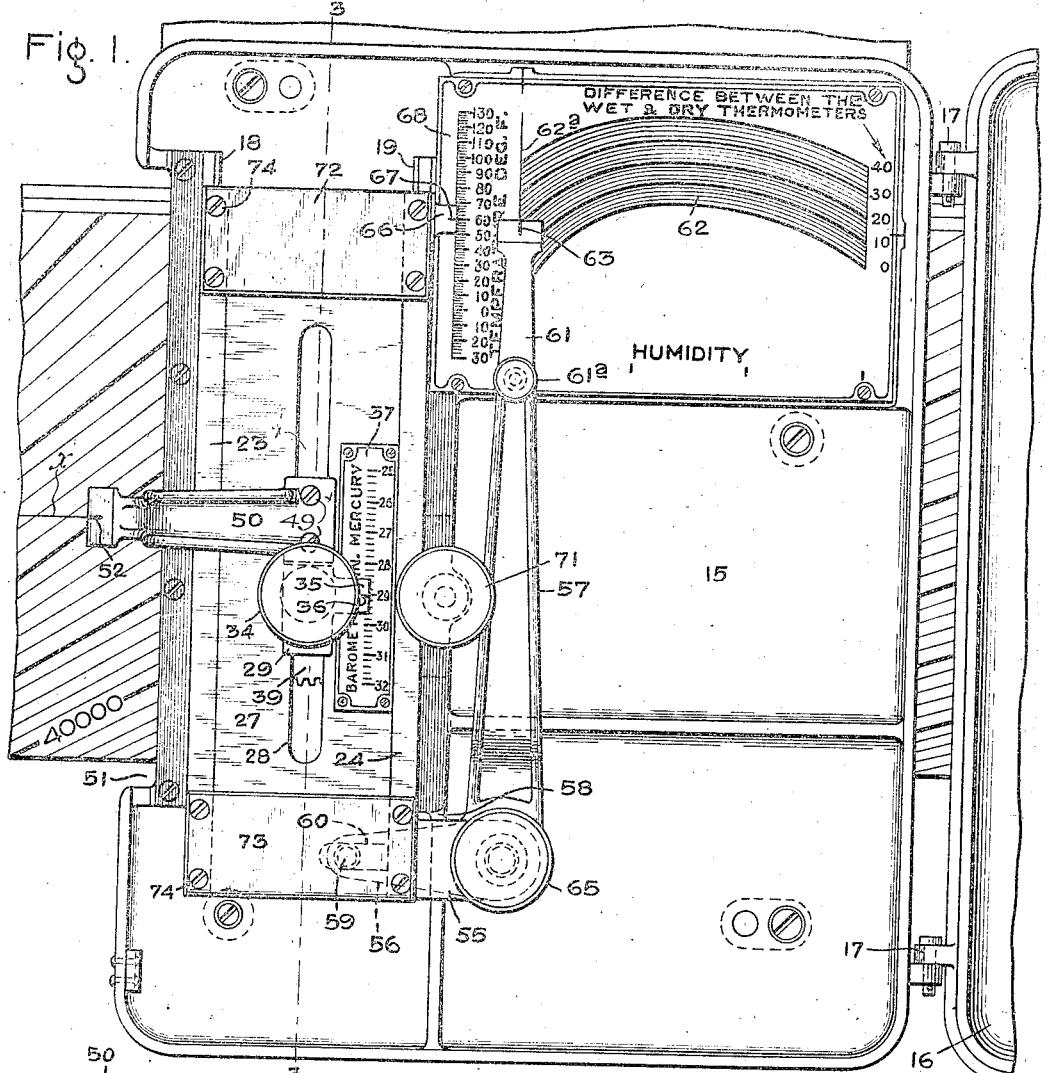

L. C. LOEWENSTEIN.
VOLUME CORRECTOR.
APPLICATION FILED DEC. 9, 1916.
1,313,099.
Patented Aug. 12, 1919.
4 SHEETS—SHEET 2.
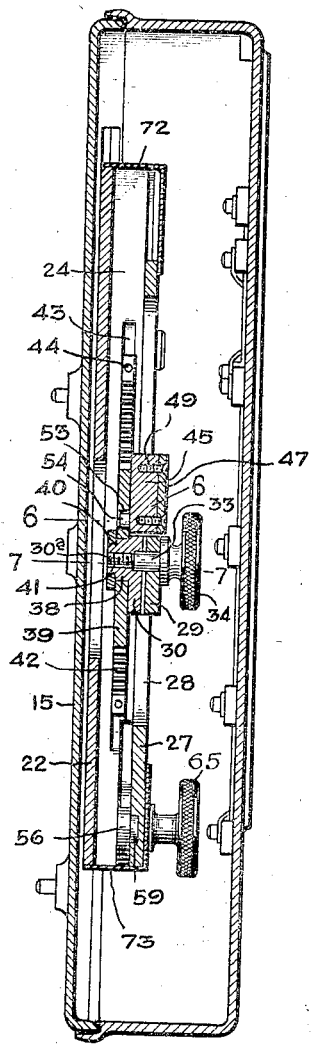
Fig. 3.
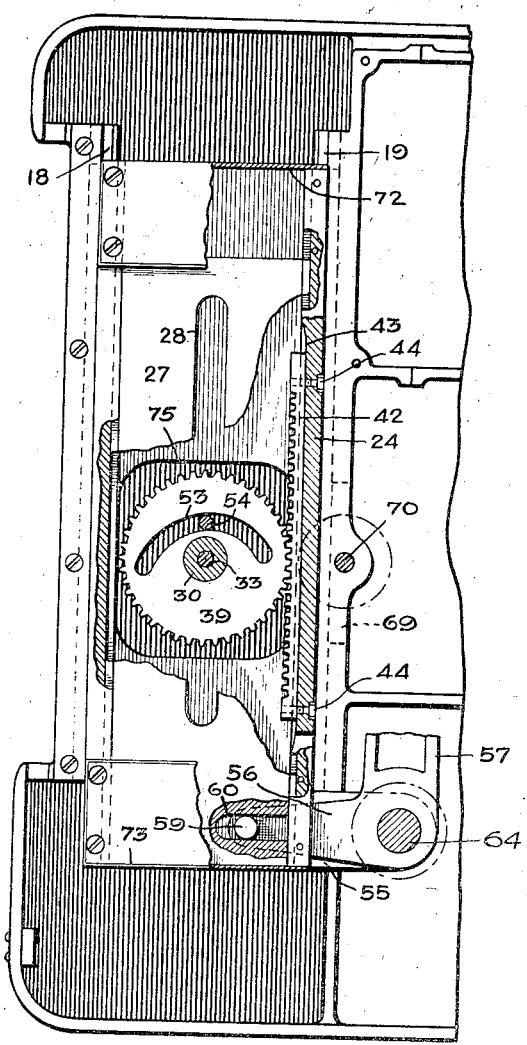
Fig. 4.
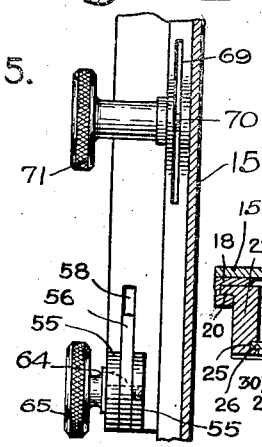
Fig. 5.
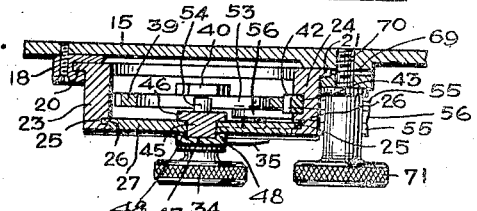
Fig. 6.
Fig. 7.
Inventor,
Louis C. Loewenstein,
by
Att'y.

L. C. LOEWENSTEIN.
VOLUME CORRECTOR.
APPLICATION FILED DEC. 9, 1916.

1,313,099. Patented Aug. 12, 1919.
4 SHEETS—SHEET 3.

Inventor,
Louis C. Loewenstein,
by
Att'y.

UNITED STATES PATENT OFFICE.

LOUIS C. LOEWENSTEIN, OF LYNN, MASSACHUSETTS, ASSIGNOR TO GENERAL ELECTRIC COMPANY, A CORPORATION OF NEW YORK.

VOLUME-CORRECTOR.

1,313,099.

Specification of Letters Patent.

Patented Aug. 12, 1919.

Application filed December 9, 1916. Serial No. 135,952.

*To all whom it may concern:*

Be it known that I, LOUIS C. LOEWENSTEIN, a citizen of the United States, residing at Lynn, county of Essex, State of Massachusetts, have invented certain new and useful Improvements in Volume-Correctors, of which the following is a specification.

It is often desirable to determine what volume of air or other gas under specified conditions of pressure, temperature, humidity, etc., is equivalent in weight to a given volume of air or gas under some standard conditions of pressure, temperature, humidity, etc. In other words, if one cubic foot of air referred to some "standard conditions", as for instance, 29 inches mercury barometer, 60 degrees Fahrenheit temperature and with no humidity (no moisture), has a certain weight, and therefore, contains a definite weight of oxygen, nitrogen and other constituents, it is desirable to know what volume of air under other conditions of pressure, temperature, humidity, etc., will have the same weight of air or will contain the same weight of oxygen, nitrogen, etc. This can be determined by laborious calculations, assisted by proper tables or charts based on experimental data.

One object of my present invention is to provide an improved instrument having suitable scales and pointers which, by proper manipulation can be made to determine and indicate the equivalent volume of air or other gas under certain conditions of pressure, temperature and humidity which would contain the same weight of air or of oxygen or of nitrogen, or other gas as a given volume of air at some basic or standard conditions. This instrument is preferably made to give the desired result by one definite setting for each condition as for instance, one setting for the given pressure, one setting for the given temperature, one setting for the given humidity, etc., and automatically to obtain from these individual settings a final reading without losing or disturbing any of the individual settings made, so that at any subsequent time the manipulator can refer back and see under what conditions of pressure, temperature, and humidity, etc., the equivalent volume or weight was ascertained. If, however, it is not important to retain the individual settings for inspection, or if there is no objection to obtaining the final result by more than one setting for each condition a somewhat less expensive form of instrument can be made, although the principle would remain the same.

This instrument can be made to apply to any fluid but is herein described as applying to air. The law of variation of volume of gases due to differences in temperature, pressure, moisture, etc., therein contained may be different than those applying to air, but a proper choice of scales and proportioning of the various parts of the instrument is all that is necessary to construct this instrument for the fluid in question.

A further object of my invention is to provide an improved instrument of this type which may be applied to machines handling gases so that the equivalent volume or weight of any gas or element contained in the gas may be measured, kept constant or corrected for variations of conditions, such as variations of pressure, variations of temperature, variations of moisture or humidity, etc.

Other objects of my invention and the advantages thereof are fully set forth hereinafter.

For a consideration of what I believe to be novel and my invention, attention is directed to the following specifications and the claims appended thereto.

Figure 9:
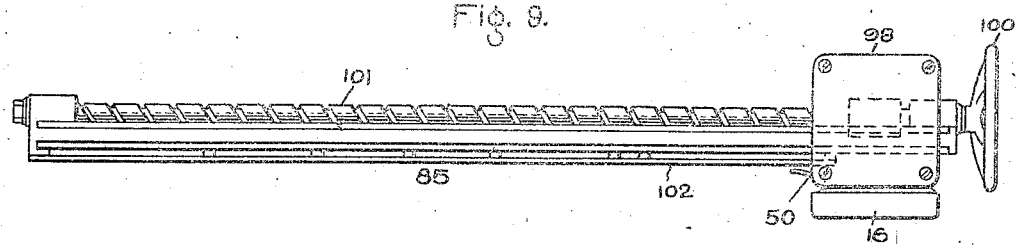
Figure 10:
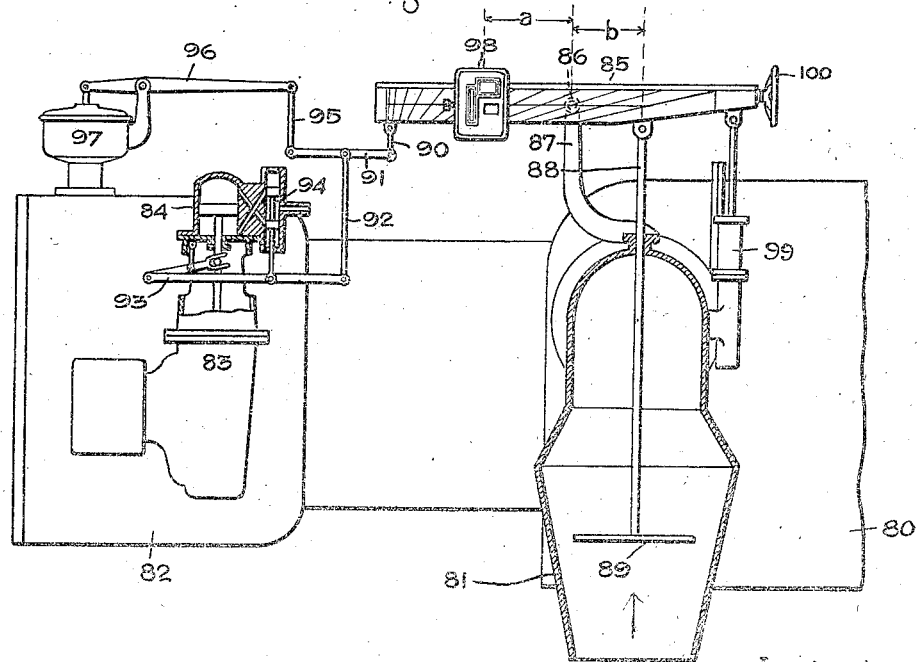
Figure 11:
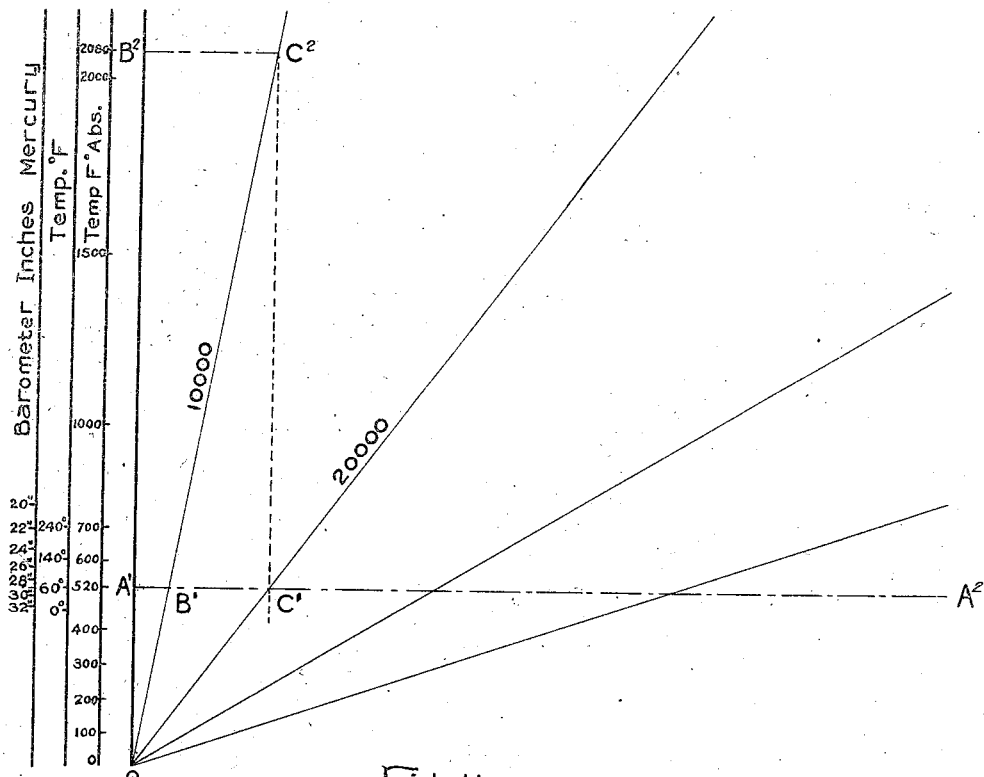

In the accompanying drawing Figure 1 is a face view of the instrument with the cover open; Fig. 2 is a top plan view, the casing being shown in section; Fig. 3 is a sectional view taken on line 3—3 in Fig. 1; Fig. 4 is a view similar to Fig. 1 but with certain parts broken away to show those behind them; Fig. 5 is a detail of certain parts; Fig. 6 is a section taken on line 6—6 in Fig. 3; Fig. 7 is a section taken on line 7—7 in Fig. 3; Fig. 8 is a side elevation of a constant volume governor scale beam with my volume corrector applied to the weight thereof; Fig. 9 is a top plan view of the scale beam of Fig. 8; Fig. 10 is a diagrammatic view of a motor driven centrifugal compressor equipped with a constant volume governing mechanism, and my improved volume corrector; and Fig. 11 is a diagram illustrating the construction and theory of the scale shown in Fig. 8.

Referring to the drawings, Figs. 1 to 7, 15 indicates a rear wall of a casing and 16 a cover hinged thereto at 17. On the wall 15 is a pair of spaced guides 18 and 19 having grooves in which slide the tongues 20 and 21 of a carriage 22 comprising a base 22ᵃ and two side flanges 23 and 24. The side flanges 23 and 24 are provided with grooves 25 in which slide tongues 26 formed on the edges of a front plate 27. It will be seen that carriage 22 can be adjusted relative to wall 15, the front plate 27 moving with it, and that the front plate can be adjusted relative to the carriage 22. In the front plate 27 is a slot 28 and on the front and back sides of the plate are members 29 and 30, Fig. 7, provided with bosses 31 and 32 which project into the slot. Members 29 and 30 are held together by a clamping stud 33 which projects through the member 29 and threads into the member 30 as indicated at 30ᵃ. The stud 33 has a knurled head 34 by which it may be turned to clamp the two members 29 and 30 to the front plate 27. When the knurled head 34 is turned to loosen the two members 29 and 30, they may then be adjusted along the slot 28. The member 29 carries a pointer 35 having an index mark 36 thereon. The pointer 35 is adapted to be moved over the barometric scale plate 37. The member 30 has a hub 38 on which is rotatably mounted a gear wheel 39 held in place by a nut 40 on the threaded end 41 of the hub 38. The gear wheel 39 meshes with a toothed rack 42 fastened in a slot 43 inside flange 24, as by means of screws 44. Arranged to slide in slot 28, and projecting through it at one side of members 29 and 30, is a rectangular block 45, Figs. 2, 3 and 6, having shoulders 46 which engage the rear surface of the sliding front plate 27. Fitting over the outer end of the block 45 is a plate 47, having flanges 48 which engage the face of front plate 27. The plate 47 is suitably fastened to the block 45 as by screws 49 and carries a pointer 50 which extends out through a slot 51 in the wall 15 and has an index mark 52 thereon. The gear wheel 39 has a cam slot 53 in it, and on the block 45 is a projecting pin 54 which enters cam slot 53. It will thus be seen that when the gear wheel 39 turns, the pin 54 will be forced along the cam slot to raise or lower the block 45 and pointer 50. Pivoted at its elbow between two projecting ears 55 carried by the side flange 24 is a bell crank lever comprising two arms 56 and 57. The arm 56 extends through a slot 58 in the side flange 24 and is provided with a short pin 59 which enters a groove 60 in the front plate 27. The arm 57 has a pointer 61, Fig. 1, on its end which plays over a scale 62, the end of the pointer being provided with an index mark 63. The pointer 61 is held in position by a suitably threaded stud having a knurled head 61ᵃ. The pivot for the bell crank lever comprises a pin 64, having a knurled head 65, the pin projecting freely through one ear 55 and having threaded engagement with the other. By turning the knurled head 65, the elbow of the bell crank lever can be firmly clamped between the two ears 55, the ears being sufficiently long and flexible to give slightly. When the bell crank lever is clamped against movement, the pin 59 on arm 56 holds the front plate 27 against movement. Projecting from the side flange 24 is a pointer 66 provided with an index mark 67, and adjacent it is a scale plate 68 over which it moves. The guide 19 is slotted in line with the groove in it, for a portion of its length, as indicated at 69, Figs. 5 and 6, and extending through the guide 19 at this point is a threaded stud 70 having a knurled head 71. By screwing this up the tongue 21 is firmly gripped in the groove to hold the carriage 22 from movement. The two ends of the carriage are closed by angle plates 72 and 73 held in place by screws 74. At the central portion of base 22ᵃ is an opening 75, Figs. 4 and 7, the purpose of which is to facilitate assembling. The cover 16 is provided with suitable transparent openings 76, Fig. 8, through which the scales 37, 62 and 68 and the ends of pointers 35, 61 and 66 are visible.

Considering now the operation of the apparatus just described, from a mechanical standpoint, the pointer 50 is the main indicating pointer, and the other three, 35, 61 and 66 are operated to bring the main pointer 50 to a resultant position. The scale 37 over which pointer 35 moves is graduated for inches of mercury of barometric pressure. The scale 62 over which the pointer 61 moves is graduated in a series of curves, each of the curves representing in degrees Fahrenheit some progressive difference in reading between the wet and dry bulb thermometers. The straight vertical line 62ᵃ on scale 62 represents the condition of no humidity (no moisture). The scale 68 over which the pointer 66 moves is graduated for temperature in degrees Fahrenheit.

Assume now that the instrument is set for some "standard" conditions—for example, 29 inches mercury barometric pressure, 60 degrees Fahrenheit temperature, and no moisture. Then the pointer 35 is set at 29 inches on the scale 37, and pointer 66 at 60 degrees on the scale 68, and the pointer 61 vertically or on the perfectly dry air line 62ᵃ on scale 62. The pointer 50 will have assumed a position which may be taken as the arbitrary "unity" of a scale over which pointer 50 moves. The knurled heads 34, 65 and 71 are screwed down so that all the movable parts are clamped in fixed positions. Assume now that it is desired to determine the volume equivalent in weight to the weight of a given volume of air under the "standard" conditions of 29 inches mercury pressure, 60 degrees Fahrenheit temperature and no moisture. For instance, assume that it is desired to determine this volume of air at 90 degrees Fahrenheit temperature, and 30 inches mercury barometric pressure and a humidity equivalent to 10 degrees Fahrenheit difference between the wet and dry bulb thermometer readings, which contains the same weight of air (hence same weight of oxygen, nitrogen, etc.,) as a unit volume of air under the "standard" conditions.

To accomplish this, the knurled head 71 may first be turned to unclamp the tongue 21. The carriage 22, together with all the parts carried thereon, is then moved bodily in the grooves in guides 18 and 19 until the index 67 on pointer 66 is opposite the line representing 90 degrees Fahrenheit. It is then clamped in this position by screwing down the knurled head 71. With this movement, it will be seen, the main pointer 50 is moved bodily directly with the carriage. The knurled head 34 may next be turned to unclamp members 29 and 30 and these parts are then slid along the slot 28 until the index mark 36 on pointer 35 comes to the point representing 30 inches barometer on the scale 37. During this movement the gear wheel 39 rides along the rack 42, and is turned by it. This turns the cam slot 53 in wheel 39 and causes the pin 54 to move along it, which in turn moves the block 45 and pointer 50. The knurled head 34 is now screwed down to clamp the pointer 35 in its new adjusted position. The knurled head 65 is now turned to unclamp the bell crank lever comprising arms 56 and 57, and this is now turned on its pivot to bring the index mark 63 on pointer 61 to the line marked 10 degrees (representing the difference in readings of the wet and dry bulb thermometers) on scale 62. This tilts the lever arm 56 and through the pin 59 which engages groove 60 in the front plate 27, slides the front plate in the grooves 25. The front plate carries with it the gear wheel 39 and since the rack is stationary, the gear wheel will be turned, thus adjusting the pointer 50 through the engagement of pin 54 with slot 53. The position which the main pointer 50 has now assumed is the resultant of the three adjustments and from its position the equivalent volume of air at the conditions of 90 degrees Fahrenheit temperature, 30 inches mercury barometric pressure and a humidity corresponding to 10 degrees difference in readings of the wet and dry bulb thermometers can be determined from a suitable scale over which the pointer 50 travels which would contain the same weight of air as is contained in some unit volume of air under the former "standard" conditions.

Referring now to the application of my invention to a gas handling machine I will describe for illustration, specifically, its application to the governing mechanism of a centrifugal compressor when the latter is to furnish air to a blast furnace. In this case it is desirable to be able to furnish a predetermined weight of air (or of oxygen) to the blast furnace, irrespective of the pressure required to force this weight of air through the furnace. Heretofore, a constant volume governor was used for regulating the speed of the motor driving the air compressor, so that a constant volume of air could be delivered to the blast furnace irrespective of the pressure required to force this air through the furnace. The metering of this air was preferably performed before the air entered the compressor because at that point the air was generally more uniform or under the least varying conditions. But even air under ordinary atmospheric conditions varies considerably as to the weight of oxygen, nitrogen, etc., it contains in any given volume depending chiefly on the existing barometric pressure, the existing temperature and the existing moisture contained in the air. Prior to my invention, the constant volume governor of such a compressor was calibrated in divisions representing definite volumes of air, as for instance 5000 cubic feet per minute, 10000, 15000 to 50000 cubic feet, etc., of air per minute and referred to air under some "normal" or "standard" conditions, as for instance, 29 inches mercury barometric pressure, 60 degrees Fahrenheit temperature and no moisture (perfectly dry air). However, these conditions of the air seldom obtain and these conditions vary continuously. The barometric pressure rises and falls daily, the temperature varies over wide limits as between summer or winter, or day or night, or even from hour to hour, and the humidity is greater or less. Therefore, it was found not at all unusual when the constant volume governor was set for a certain volume of air per minute to be delivered to the blast furnace to find the actual weight of air (or oxygen) delivered would vary ten per cent. in weight under existing conditions from what would be delivered under "standard" conditions of air. The blast furnace requires a constant weight of air (or really of oxygen as a definite weight of oxygen is required for combustion purposes), and if the weight of air varies with each variation of barometric pressure, temperature, or humidity, the efficient operation of the blast furnace is disturbed. My invention applied to such a constant volume governor now permits a volume correction to be made by any operator so that at any time the true or exact weight of air can be delivered based on a predetermined volume of "standard" air necessary for most efficient blast furnace blowing.

Referring now to Figs. 8, 9 and 10, 80 indicates a centrifugal compressor, and 81 the air inlet conduit thereof. It is shown as being driven by a steam turbine indicated at 82. The valve mechanism controlling the admission of steam to the turbine is indicated at 83, and a fluid actuated motor for operating this valve mechanism is indicated at 84. The turbine driven compressor set is provided with the usual form of constant volume governing mechanism comprising a beam 85 pivoted on a shaft 86 carried by an arm 87. One end of the beam is connected to a rod 88 upon the lower end of which is a float 89 in the inlet conduit 81. On the end of beam 85 is fixed a link 90 connected to one end of a floating lever 91. The lever 91 is connected by a rod 92 to the fluid actuated motor 84, the connection involving a usual form of follow up device, or restoring mechanism, as is well known, the same being indicated at 93. The pilot valve of the fluid actuated motor is indicated at 94. The other end of the floating lever 91 is connected by a link 95 to the end of a governor lever 96 which is actuated by the speed governor 97. The constant volume governor weight is indicated at 98 and is adjustable along the beam 85, and 99 indicates a dashpot for steadying the movement of the beam. The hand wheel 100 can be turned to adjust the weight along the beam 85. This hand wheel is attached to a threaded rod 101 passing through a threaded nut attached to the weight 98, as is shown clearly in Fig. 9. The threaded rod 101 is journaled near its two ends so that when the hand wheel is turned the weight is moved along the beam.

Proper calibrations on the beam indicate where the weight 98 is to be set for the desired volume of flow, and the float 89 acts on the beam 85 to tilt it so as to cause the fluid motor 84 to open or close the valve mechanism 83 which in turn admits more or less fluid to the turbine and thereby causes such regulation in the speed of the turbine as to obtain sufficient air discharge pressure from the compressor as is required to force the proper quantity or volume of air through the air discharge conduit of the compressor. If the sliding weight 98 is set for a certain volume of air and less air flows past the float 89, the float lowers a little, thus tilting the beam 85 and opening the valve mechanism 83 to admit more elastic fluid to the turbine and causing an increase in the speed of the turbine and compressor. Increase of speed of the compressor raises the pressure of the discharged air and also the volume delivered and therefore more air passes by the float 89 tending to raise the same and place it in the correct position for the volume of air desired. On the other hand, if the volume increases then the float will rise and will tilt the beam in the opposite direction. This motion will close off the elastic fluid supply to the turbine until the unit will have reached a proper reduced speed for the volume of air desired. The speed governor 97 is normally inactive the turbine being wholly under the control of the constant volume governor and only comes into play to take control in case of excess speed, in other words, it is somewhat of the nature of an emergency governor. A constant volume governing mechanism as just described is well known.

Heretofore it has been customary to calibrate the beam 85 by providing graduations or notches to which the sliding weight 98 is set for various volumes of air. Under these circumstances the beam has been graduated for some "standard" conditions of air. For example, 29 inches mercury barometric pressure, 60 degrees Fahrenheit temperature and no moisture. In this connection it is desired to call attention to the fact that the scale of calibrations or notches on such a beam is a quadratic scale, that is, the distances of the various graduations in cubic feet of air per minute from the zero mark are proportional to the square of the corresponding quantities of air; for instance, the 2000 cubic foot mark is four times, and the 3000 cubic foot mark is nine times as far from the zero mark as the 1000 cubic foot mark. These graduations or markings to which the sliding weight must be placed in order to govern for any particular volume of air are correct only if the air corresponds to the conditions for which the scale has been calibrated. Usually these conditions do not obtain in practice. In applying my invention it is now possible to correctly set the sliding weight along the beam so as to deliver the correct weight of air under any conditions of pressure, temperature or humidity.

In the practical application of this instrument to a constant volume governor an ordinary calibrated scale over which the pointer 50 travels is not sufficient, and a different scale which I believe to be novel and which forms a part of my invention is used. This scale is best described by a discussion of the theory which determines the proper proportioning of the various parts of the instrument and the scale referred to.

In applying my improved volume corrector to the constant volume governor of a centrifugal compressor, I provide on the beam a scale plate 102 calibrated as shown in Fig. 8. In this figure the central longitudinal line A indicates a calibration line for some "standard" conditions, as, for example, 29 inches of mercury barometric pressure, 60 degrees Fahrenheit temperature, and no moisture. On the scale plate are a series of slanting lines B, representing different volumes of air flow per minute. The lines B all focus at a point C which is on a vertical line D passing through the zero point of the scale on plate 102. Consider, for example, that the assumed standard conditions of temperature, pressure and humidity exist. Then when my volume corrector mounted on the sliding weight of the constant volume governor is set, as before described, for these conditions, the index mark 52 on pointer 50 will be on the central longitudinal line A. For any desired volume of air flow per minute then, the hand wheel 100 may be turned to move the sliding weight with its volume corrector so that the pointer 50 will coincide with or indicate the line B representing such volume of flow, say 50,000 cubic feet of air per minute. If now some other conditions of temperature, pressure and humidity obtain, then the volume corrector is adjusted, as already explained for these new conditions. This will bring the index mark 52 on pointer 50 either above the line A or below it. The hand wheel 100 is now turned to again bring index mark 52 to the line representing the desired volume of air flow per minute, for instance, 50,000 cubic feet. It will be understood, of course, that under the new conditions the compressor is not actually delivering the same volume of air per minute as heretofore, but is delivering a volume which, under the assumed new conditions contains the same weight of air as was contained in the 50000 cubic feet of air per minute under "standard" conditions.

The actual practical application of constant volume governing with proper volume correction for blast furnace blowing for instance is as follows. From proper chemical analysis of the material charged into a blast furnace the proper weight of air (or oxygen) per minute required for efficient blowing can be determined. Or the proper weight of air for blast furnace blowing may be determined experimentally. A greater or less amount of air decreases the efficiency. Having once determined this proper weight of air per minute required it can be translated into a given volume of air of standard conditions. The air conditions however, do not remain constant and therefore the volume corrector can now be applied so that under any other air conditions the proper equivalent volume may be obtained, although the index mark 52 on pointer 50 is set on the scale on the calibrated line indicating the original number of cubic feet of "standard" air.

A further refinement may be obtained by proper proportioning the scales on the instrument to take care of the excess of oxygen required in the furnace when there is any moisture present in the air because a certain amount of heat generated in the blast furnace must be consumed by the heating of this moisture as it passes through the blast furnace. But as this excess of oxygen requires also a certain excess of charging coke to produce this additional heat this correction can most frequently be omitted because the error is small. Attention, however, is called to the fact that the volume corrector can readily be calibrated to take care of this correction if required.

The theoretical principles involved in the application of the volume corrector and scale to a constant volume governor may now be given as illustrative of the principles involved in the application of my invention to other purposes. Referring to Fig. 10 the sliding weight 98 having weight W acting at a distance $a$ from the fulcrum 86, effects the balance of the force P of the momentum of the incoming air acting at a distance $b$ from fulcrum 86. For ease of explaining, the other parts of the governor are here considered as without weight—proper corrections for their weight are common and easily understood. In other words $Pb$ may be considered as proportional to $Wa$. Now if $W_1$ lbs. of air per second impinge on the float 89 with a velocity of V feet per sec., the force P in lbs. $= \dfrac{W_1 V}{g}$. But, if the density $d$ of the air remains constant $$V = \dfrac{W_1}{Sd}$$

in which S is the area in square feet of the float 89 normal to V, hence $$P = \text{constant} \times \dfrac{W_1^2}{d}.$$

Consequently, for a given position of the sliding weight 98, the weight of the incoming air $W_1$ is directly proportional to the square root of the density $d$, since P remains constant for the constant $Wa$. So long as it is assumed that the density $d$ of the incoming air remains constant, the moment $Wa$ is proportional to $W_1^2$; that is the lever arm $a$ of the sliding weight 98 is proportional to the square of the weight of the incoming air. Therefore in Fig. 8 the distances of the various graduations (in cu. ft. of air per minute) from the zero mark are proportional to the squares of the corresponding quantities of air; that is, the distance of the 2000 cu. ft. mark from zero is four times and the 3000 cu. ft. mark nine times, etc., the distance of the 1000 cu. ft. mark from zero. Usually the density $d$ of the incoming air varies, due to changes in atmospheric conditions; in that case the condition $$\dfrac{W_1^2}{d} = \text{a constant}$$

requires that the observed value of $W_1$ be multiplied by $$\sqrt{\dfrac{d_1}{d_0}},$$

where $d_1$ is the density of air at actual conditions and $d_0$ the density of the air for which the governor has been calibrated, in order to obtain the correct value of $W_1$ under the actual conditions.

5. From theoretical physics $d$ is proportional to $\frac{P_0}{T_0}$ where $P_0$ is the absolute pressure of the air alone, and $T_0$ its absolute temperature. If the air is free from moisture (other impurities being negligible) $P_0$ may be replaced by the barometric pressure or reading $P_2$ in lbs. per sq. inch or in inches mercury. If water vapor is present, its pressure must be ascertained and subtracted from $P_2$ to give the correct value of $P_0$. The pressure of the water vapor can be computed from the observed atmospheric temperature and from the relative humidity as indicated, say by a dry and wet bulb thermometer arrangement.

In order now to apply my volume corrector and special scale to this governor the following method of calibrating the scale is necessary.

Referring to Fig. 11, which is of course, purely diagrammatic and not to scale, the line $A^1A^2$ represents the center line or base line of my new scale and it can be graduated like the usual scale of the ordinary constant volume governor for some "standard" air conditions, say for dry air at 60 degrees Fahrenheit temperature and 29 inches mercury barometer. As explained before, the distance $A^1C^1$ to the 20000 cubic foot mark is four times the distance $A^1B^1$ to the 10000 cu. ft. mark, etc., the point $A^1$ representing zero quantity. Now suppose that with the sliding weight placed at 20000 cu. ft. the temperature condition alone changes from 60 degrees or 520 degrees absolute to 2080 degrees absolute. The correct volume now held by the governor if the sliding weight is not moved will then be, as previously explained $$20000\sqrt{\frac{520}{2080}} \text{ or } 10000 \text{ cu. ft.}$$

Therefore if $OA^1$ represents to some scale 520 degrees and $OB^2$ represents to the same scale 2080 degrees then $$OB^2:OA^1::B^2C^2:A^1B^1::A^1C^1:A^1B^1.$$

Consequently the line $OB^1C^2$ is always correct for 10000 cu. ft. of air at the conditions represented by any horizontal line such as $A^1A^2$. If, therefore, the pointer for setting the sliding weight is moved up or down over a proper scale of temperatures, whenever the pointer is set on the 10000 cu. ft. line $OC^2$ the quantity 10000 is correct. This proper scale for temperatures, as indicated at the left on Fig. 11 has uniformly spaced divisions and represents proportional distances vertically from O— in absolute degrees or their equivalents in ordinary degrees Fahrenheit. The distance $OA^1$ represents to some scale 520 degrees, the distance $OB^2$ to the same scale 2080 degrees, etc. In an actual instrument or scale the distance $OA^1$ would be very long and need not be shown actually on the scale, and the actual scale would only cover the general range of temperatures desired and usually marked in ordinary degrees Fahrenheit. The sloping lines of "constant volumes" however would have to converge to some imaginary zero as O in the figure and the temperature scale must be laid off in uniform and proper divisions according to the principles just explained.

Now as regards proper scale of barometric pressures. A change in barometer from the "standard" condition of 29 inches mercury to some other value $P_2$ affects the volume of air (referred to 29 inches and 60 degrees) held by the governor to the same extent as if the barometric pressure remained at 29 inches and the temperature alone changed from 520° F. abs. to some other temperature T° abs. such that $P_1T°=29\times520$, since the change in density of the air whether by barometer alone or by temperature alone would then be the same; in other words, doubling the barometer is equivalent to halving the absolute temperature. Therefore a barometer scale can be arranged on the temperature scale or as an independent scale so that the distance of the 29 inches marking to the 30 inches marking would be equivalent to 17.3 degrees on the temperature scale or the distance of the 29 inches marking to 28 inches marking would be equivalent to 18.6 degrees on the temperature scale, etc. Therefore a proper scale for barometric pressure readings may be constructed and the above described constant quantity lines can then be used to correct for variations in barometer, the pointer for setting the sliding weight being moved up and down not only for the temperature corrections but also for the barometer corrections. In other words the correction for variations in barometer may be converted into the scale of temperature corrections and the pointer on the sliding weight moved to record the resultant movements of the combined correction for temperature and barometer.

It will be noticed that the barometer scale is a reciprocal scale (that is inversely proportional to the absolute temperature), and that ordinarily the graduations would not be uniform (see Fig. 11). It is possible, however, and preferable, to make the barometer graduations strictly uniform throughout by making one point or graduation of the barometer scale correct, and compensating for the inaccuracy of uniform graduations at other points by giving the sliding weight pointer automatically an additional corrective motion by means of a properly constructed or proportioned cam or otherwise. This uniform graduating of the barometer scale is preferable in order to apply the proper correction for humidity in the air in a simple and satisfactory manner as follows:

The barometric pressure reading as usually observed is equal to the sum of the air pressure plus the vapor pressure. If the air is saturated, that is, if it contains all the water vapor it is capable of holding without precipitation at the particular temperature, the value of the vapor pressure at the given temperature can be ascertained experimentally. If the degree of saturation or the relative humidity is, say, only 20% or 50% then the vapor pressure as determined experimentally must be multiplied by 0.20 or 0.50 as the case may be. The most usual method of ascertaining the relative humidity of the air is by means of a wet and dry bulb thermometer arrangement. In its simplest form, it consists of two similar thermometers the bulb of one of which is covered by a wet piece of sponge. If the air is fully saturated no evaporation into it can take place and the two thermometers record the same temperature. When the air is only partly saturated, the evaporation from the wet bulb lowers the thermometer reading; so that the difference in the readings of the wet and dry thermometers can be taken as a measure of the relative humidity of the air. For any combination of relative humidity and atmospheric temperature the vapor pressure is a definite quantity. This vapor pressure must be subtracted from the observed barometer reading in order to give the net or correct air pressure to be used on the barometer scale above described; since it is the density (and therefore the actual pressure) of the air alone that is of importance, and not the density of the mixture of air and water vapor. It is perhaps worth repeating that the humidity correction in pounds per square inch or in inches mercury depends mainly on the atmospheric temperature and on the difference between the wet and dry bulb thermometer readings. (Relative humidity.) It depends slightly on the barometer reading but the amount is not large so that in actual practice it may be neglected. The humidity correction can therefore be made mechanically if the pointer on the sliding weight is given an additional correction or movement which would be the equivalent amount of a certain subtraction of pressure on the barometric scale equal to the correction for the pressure due to water vapor. It is for this reason that it is preferable to make the divisions on the barometric scale uniform so that, for instance, a half inch mercury correction would require the same movement no matter at what reading the barometer scale happens to be set. Inspection of the mechanism of my instrument shows this to be accomplished; for, no matter where the pointer sets as to barometer reading, the humidity correction moves the final pointer on the sliding weight the proper amount. It will also be noticed that the humidity is dependent on the atmospheric temperature (that is when the temperature is high the water vapor in the saturated air is higher than when the temperature is low. In my instrument the setting of the proper pointer on the temperature scale automatically sets the pointer for humidity to the correct temperature also.

My invention may also be used to correct for the volume or weight of a fluid for any changes occurring in its composition. For example it is desirable to use enriched air (ordinary air mixed with oxygen) for commercial purposes (such as blowing a blast furnace). The main scale is then calibrated in volumes, or weights for some assumed standard composition, that is, some assumed standard mixture of oxygen, nitrogen, etc. The other scales are calibrated in division representing various quantities of each element or group of elements contained in the fluid in question. By proper settings of the individual pointers on each of the individual scales in question, the main pointer is moved to indicate the equivalent volume or weight of the fluid of standard composition which would equal the volume or weight of the fluid having the new composition.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In an indicating instrument, a member having a scale thereon calibrated in quantities of fluid under some standard conditions, an indicating pointer, and means for adjusting said pointer to indicate equivalent quantities of fluid under conditions other than standard.

2. In an indicating instrument, a member having a scale thereon calibrated in volumes of fluid under some standard condition, an indicating pointer, and means for adjusting said pointer to indicate equivalent volumes of fluid under conditions other than standard.

3. In an indicating instrument, a member having a scale thereon calibrated in weight of fluid under some standard conditions, an indicating pointer, and means for adjusting said pointer to indicate equivalent weights of fluid under conditions other than standard.

4. In an indicating instrument, a member having a scale thereon calibrated in volumes of fluid under some standard composition, an indicating pointer, and means for adjusting said pointer to indicate equivalent volumes for compositions other than standard.

5. In an indicating instrument, a member having a scale thereon calibrated in weight of fluid under some standard composition, an indicating pointer, and means for adjusting said pointer to indicate equivalent weights for compositions other than standard.

6. In an instrument for indicating the volume of a fluid which is equivalent to some standard volume, a plate having an indicating scale thereon, an indicating pointer, and means for adjusting it for variations in a condition or conditions of said fluid.

7. In a volume corrector, an indicating pointer, and means for adjusting it in accordance with temperature, pressure and humidity.

8. In a volume corrector, an indicating pointer, and means for adjusting it to correct for temperature, pressure and humidity.

9. In a volume corrector, a main indicating pointer, separate pointers for temperature, pressure and humidity, scales over which said last named pointers move, and means for transmitting the resultant of the movements of the last named pointers to the main indicating pointer.

10. In a volume corrector a main indicating pointer, separate pointers for temperature, pressure, and humidity, scales over which said last named pointers move, and means for transmitting movement from each of the last named pointers to the main indicating pointer.

11. In a volume corrector, a main indicating pointer, separate pointers for temperature, pressure, and humidity, scales over which said last named pointers move, means connecting the temperature pointer directly to the main indicating pointer so that the two move together, and means for imparting a differential movement from the other two pointers to the main indicating pointer.

12. In a volume corrector, a main indicating pointer, separate pointers for temperature, pressure, and humidity, scales over which said last named pointers move, means connecting the temperature pointer directly to the main pointer, and means including a cam for imparting movement from the other two pointers to the main indicating pointer.

13. In a volume corrector, the combination of a base, a frame slidable thereon, a plate slidable on the frame, and a member slidable on the plate, a main indicating pointer carried by the frame and slidable relative thereto, a pointer fixed on the frame, a temperature scale for it, a pointer carried by the slidable member, a barometer scale for it, a pointer pivoted on the frame and connected to move the plate relative to the frame, and means for transmitting movement from the slidable member and plate to the main indicating pointer.

14. In a volume corrector, the combination of a main indicating pointer, and means for adjusting it in accordance with temperature and pressure.

15. In a volume corrector, the combination of a main indicating pointer, and means for adjusting it in accordance with temperature and humidity.

16. In a volume corrector, the combination of a main indicating pointer, and means adjusting it in accordance with pressure and humidity.

17. In a volume corrector, the combination of a main indicating pointer, means for adjusting it to correct for temperature, means for adjusting it to correct for barometric pressure, and means for modifying said last named adjustment to correct for humidity.

18. In a volume corrector, the combination of a main indicating pointer, a temperature correcting pointer and a humidity correcting pointer which move together to adjust the main indicating pointer for temperature, and means for moving the humidity correcting pointer independently of the temperature correcting pointer, and means for transmitting such movement to the main indicating pointer.

19. The combination of a plate having a volume indicating scale thereon, a pointer adapted to be moved over the scale, and a member which carries the pointer and is adapted to be adjusted for temperature.

20. The combination of a plate having a volume indicating scale thereon, a pointer adapted to be moved over the scale, a member which carries the pointer and is adapted to be adjusted for temperature, and means for adjusting the pointer to correct for changes in barometric pressure.

21. The combination of a plate having a volume indicating scale thereon, a pointer adapted to be moved over the scale, a member which carries the pointer and is adapted to be adjusted for temperature, and means for adjusting the pointer to correct for changes in barometric pressure and for humidity.

22. The combination of a plate having a volume indicating scale thereon, a pointer adapted to be moved over the scale, a member which carries the pointer and is adapted to be adjusted for temperature, and means for adjusting the pointer to correct for humidity.

23. The combination with a compressor having a governing mechanism which may be set to cause the compressor to deliver a certain weight of fluid under some standard conditions, of means for adjusting said governing mechanism to correct for any variations from said conditions.

24. The combination with a centrifugal compressor having a governing mechanism which may be set to cause the compressor to deliver a certain weight of fluid under fixed conditions of temperature, pressure, and humidity, of means for adjusting said governing mechanism to correct for variations in temperature in said fluid.

25. The combination with a centrifugal compressor having a governing mechanism which may be set to cause the compressor to deliver a certain weight of fluid under fixed conditions of temperature, pressure, and humidity, of means for adjusting said governing mechanism to correct for variations in the pressure of said fluid.

26. The combination with a centrifugal compressor having a governing mechanism which may be set to cause the compressor to deliver a certain weight of fluid under fixed conditions of temperature, pressure, and humidity, of means for adjusting said governing mechanism to correct for variations in the humidity of the fluid.

27. The combination with a centrifugal compressor having a governing mechanism which may be set to cause the compressor to deliver a certain weight of fluid under fixed conditions of temperature, pressure, and humidity, of means for adjusting said governing mechanism to correct for variations in the temperature and pressure of the fluid.

28. The combination with a centrifugal compressor having a governing mechanism which may be set to cause the compressor to deliver a certain weight of fluid under fixed conditions of temperature, pressure, and humidity, of means for adjusting said governing mechanism to correct for variations in the temperature and humidity of said fluid.

29. The combination with a centrifugal compressor having a governing mechanism which may be set to cause the compressor to deliver a certain weight of fluid under fixed conditions of temperature, pressure, and humidity, of means for adjusting said governing mechanism to correct for variations in the pressure and humidity of the fluid.

30. The combination with a centrifugal compressor having a governing mechanism which may be set to cause the compressor to deliver a certain weight of fluid under fixed conditions of temperature, pressure, and humidity, of means for adjusting said governing mechanism to correct for variations in the temperature, pressure, and humidity of said fluid.

31. The combination with a centrifugal compressor having a volume governing mechanism comprising a beam and a weight movable thereon, of a scale plate on the beam having a scale thereon which indicates volume of flow, a pointer which moves over the scale, and means for adjusting the pointer relative to the scale to correct for variations in temperature, pressure, and humidity.

32. The combination with a centrifugal compressor having a volume governing mechanism comprising a beam and a weight movable thereon, of a scale plate on the beam having a scale thereon which indicates volume of flow, a pointer which moves over the scale, and means for adjusting the pointer relative to the scale to correct for variations in temperature.

33. The combination with a centrifugal compressor having a volume governing mechanism comprising a beam and a weight movable thereon, of a scale plate on the beam having a scale thereon which indicates volume of flow, a pointer which moves over the scale, and means for adjusting the pointer relative to the scale to correct for variations in pressure.

34. The combination with a centrifugal compressor having a volume governing mechanism comprising a beam and a weight movable thereon, of a scale plate on the beam having a scale thereon which indicates volume of flow, a pointer which moves over the scale and means for adjusting the pointer relative to the scale to correct for variations in humidity.

35. The combination with a centrifugal compressor having a volume governing mechanism comprising a beam and a weight movable thereon, of a scale plate on the beam having a scale thereon which indicates volume of flow, a pointer which moves over the scale, and means for adjusting the pointer relative to the scale to correct for variations in temperature and pressure.

36. The combination with a centrifugal compressor having a volume governing mechanism comprising a beam and a weight movable thereon, of a scale plate on the beam having a scale thereon which indicates volume of flow, a pointer which moves over the scale, and means for adjusting the pointer relative to the scale to correct for variations in temperature and humidity.

37. The combination with a centrifugal compressor having a volume governing mechanism comprising a beam and a weight movable thereon, of a scale plate on the beam having a scale thereon which indicates volume of flow, a pointer which moves over the scale, and means for adjusting the pointer relative to the scale to correct for variations in pressure and humidity.

38. The combination with a centrifugal compressor having a volume governing mechanism comprising a beam, a weight adjustable thereon and a float which rides on the gas passing through the compressor, of a scale plate on the beam having a volume indicating scale thereon, a pointer carried by the weight for indicating the adjustment of the weight on the scale, and means for adjusting the pointer relative to the scale to correct for variations in temperature.

39. The combination with a centrifugal compressor having a volume governing mechanism comprising a beam, a weight adjustable thereon and a float which rides on the gas passing through the compressor, of a scale plate on the beam having a volume indicating scale thereon, a pointer carried by the weight for indicating the adjustment of the weight on the scale, and means for adjusting the pointer relative to the scale to correct for variations in pressure.

40. The combination with a centrifugal compressor having a volume governing mechanism comprising a beam, a weight adjustable thereon and a float which rides on the gas passing through the compressor, of a scale plate on the beam having a volume indicating scale thereon, a pointer carried by the weight for indicating the adjustment of the weight on the scale, and means for adjusting the pointer relative to the scale to correct for variations in humidity.

41. The combination with a centrifugal compressor having a volume governing mechanism comprising a beam, a weight adjustable thereon and a float which rides on the gas passing through the compressor, of a scale plate on the beam having a volume indicating scale thereon, a pointer carried by the weight for indicating the adjustment of the weight on the scale, and means for adjusting the pointer relative to the scale to correct for variations in temperature and pressure.

42. The combination with a centrifugal compressor having a volume governing mechanism comprising a beam, a weight adjustable thereon and a float which rides on the gas entering the compressor, of a scale plate on the beam having a volume indicating scale thereon; a pointer carried by the weight for indicating the adjustment of the weight on the scale, and means for adjusting the pointer relative to the scale to correct for variations in temperature and humidity.

43. The combination with a centrifugal compressor having a volume governing mechanism comprising a beam, a weight adjustable thereon and a float which rides on the gas entering the compressor, of a scale plate on the beam having a volume indicating scale thereon, a pointer carried by the weight for indicating the adjustment of the weight on the scale, and means for adjusting the pointer relative to the scale to correct for variations in pressure and humidity.

44. The combination with a centrifugal compressor having a volume governing mechanism comprising a beam, a weight adjustable thereon and a float which rides on the gas entering the compressor, of a scale plate on the beam having a volume indicating scale thereon, a pointer carried by the weight for indicating the adjustment of the weight on the scale, and means for adjusting the pointer relative to the scale to correct for variations in pressure, temperature and humidity.

45. The combination with a compressor having a governing mechanism which may be set to cause the compressor to deliver a certain volume or weight of fluid under some standard composition, of means for adjusting said governing mechanism to correct for any variations from said standard composition.

46. A scale plate for a governor beam comprising a plate calibrated by sloping lines which extend crosswise thereof, and represent volumes equivalent to a given weight so that every longitudinally extending line intersecting the sloping lines forms a quadratic scale of divisions.

47. The combination of a plate having a volume indicating scale thereon, a pointer adapted to be moved over the scale, and means for setting the pointer comprising a member which is adjusted for temperature, a member which is adjusted for pressure, and a member which is adjusted for difference in readings between a wet and dry bulb thermometer, and plates having scales thereon for each of the said members, said members being successively adjusted and so arranged that when finally adjusted their positions indicate the readings for which they were adjusted.

48. The combination with a compressor having a governing mechanism comprising a beam having a scale plate thereon, a float which is subjected to the impingement of the current of fluid passing through the compressor, said float being connected to the beam, and an adjustable sliding weight which counter-balances the action of the fluid on the float, of a volume corrector carried by the weight and having a pointer cooperating with the scale plate, said scale plate being calibrated in lines representing definite volumes of fluid in terms of some standard conditions, and means for adjusting the position of the pointer for varying conditions of the fluid whereby said pointer can be utilized to locate the weight on the beam so as to permit a volume of fluid to pass through the compressor which has an equivalent weight to the volume of fluid indicated on the scale when under said standard conditions.

49. The combination with a compressor having a governing mechanism comprising a beam having a scale plate thereon, a float which is subjected to the impingement of the current of fluid passing through the compressor, said float being connected to the beam, and an adjustable sliding weight which counterbalances the action of the fluid on the float, of a volume corrector carried by the weight and having a pointer coöperating with the scale plate, said scale plate being calibrated in sloping lines running crosswise thereof, representing definite volumes of fluid in terms of some standard condition, and means for adjusting the pointer of the volume corrector crosswise of the scale plate to position it for a variation or variations in either the temperature, pressure, or humidity of the fluid, whereby said pointer may be utilized to locate the weight on the beam so as to permit a volume of fluid to pass through the compressor, which has an equivalent weight to the volume of fluid indicated on the scale when under said standard conditions.

50. The combination with a compressor having a governing mechanism comprising a beam having a scale plate thereon, a float which is subjected to the impingement of the current of fluid passing through the compressor, said float being connected to the beam, and an adjustable sliding weight which counterbalances the action of the fluid on the float, of a volume corrector carried by the weight and having a pointer coöperating with the scale plate, said scale plate being calibrated in sloping lines running crosswise thereof, representing definite volumes of fluid in terms of some standard composition, and means for adjusting the pointer of the volume corrector crosswise of the scale plate to position it for a variation or variations in any of the elements contained in the composition of the fluid whereby said pointer may be utilized to locate the weight on the beam so as to permit a volume of fluid to pass through the compressor, which has the same weight of any specified element as contained in the fluid of standard composition.

51. The combination with a centrifugal compressor having a governing mechanism which may be set to cause the compressor to deliver a certain weight of fluid under fixed conditions of temperature, pressure, and humidity, of means for adjusting said governing mechanism to correct for variations from any one or all of said fixed conditions of temperature, pressure, and humidity.

52. The combination with a centrifugal compressor having a governing mechanism comprising a beam, and a weight adjustable thereon, said weight being adapted to be set on the beam to cause the governing mechanism to regulate the compressor to deliver a certain weight of fluid under fixed conditions of temperature, pressure, and humidity, of a pointer carried by the weight to indicate the adjustment of the weight on the beam, and means for adjusting the position of the pointer relative to the weight to correct for variations from any one or all of said fixed conditions of temperature, pressure, and humidity.

53. The combination with a centrifugal compressor having a volume governing mechanism comprising a beam, and a weight movable thereon, of a scale plate on the beam having a scale thereon which indicates volume of flow, a pointer carried by the weight for indicating the setting of the weight, and means for adjusting the pointer relative to the weight in accordance with either temperature, pressure, or humidity, so that when said pointer is set for any volume the weight will be so located that the volume actually delivered by the compressor will be a volume having a weight equivalent to the weight of the volume which the pointer indicates under some standard conditions of temperature, pressure, and humidity.

54. The combination with a centrifugal compressor having a volume governing mechanism comprising a beam, a weight adjustable thereon, and a float which rides on the fluid passing through the compressor and is connected to the beam, of a scale plate on the beam, having a volume indicating scale thereon, a pointer carried by the weight for indicating the adjustment of the weight on the beam, and means for adjusting the pointer relative to the weight for varying conditions in the fluid being compressed, whereby when said pointer is set at a given volume on the scale the weight will be so located that the volume actually delivered will be a volume having a weight equivalent to the weight of the volume indicated by the pointer when referred to some standard set of conditions.

55. The combination with a centrifugal compressor having a volume governing mechanism comprising a beam, a weight adjustable thereon, and a float which rides on the fluid passing through the compressor and is connected to the beam, of a scale plate on the beam having a volume indicating scale thereon, a pointer carried by the weight for indicating the adjustment of the weight on the beam, and means for adjusting the pointer relative to the weight for variations in either the temperature, pressure, or humidity, of the gas being compressed whereby when said pointer is set at a given volume on the scale the weight will be so located that the volume actually delivered will be a volume having a weight equivalent to the weight of the volume indicated by the pointer referred to some standard conditions of temperature, pressure, and humidity.

56. The combination with a centrifugal compressor having a volume governing mechanism comprising a beam, a weight adjustable thereon, and a float which rides on the gas passing through the compressor, of a scale on the beam calibrated by sloping lines which extend crosswise thereof and represent volumes equivalent to a given weight, so that every longitudinally extending line intersecting the sloping lines forms a quadratic scale of division, a pointer carried by the weight and adjustable thereon crosswise of the scale, and means for indicating the setting of the pointer for any combination of temperature, pressure, and humidity, whereby when said pointer is set on the scale to indicate a certain volume the weight will be so located that the volume governing mechanism will pass a volume through the compressor which will have a weight equivalent to the weight of the volume indicated by the pointer when referred to some standard conditions of temperature, pressure, and humidity.

57. The combination with a centrifugal compressor having a volume governing mechanism which may be set to cause the compressor to handle a constant volume of fluid, of means for indicating the correct setting for the volume governing mechanism whereby the volume handled under any conditions of temperature, pressure, and humidity, will be equivalent in weight to a desired volume of gas referred to some standard conditions of temperature, pressure, and humidity, said means comprising a member having a scale thereon, a main indicating pointer which coöperates with such scale, a carriage for the pointer which is movable to directly move the pointer in accordance with temperature, and means for moving the pointer relative to the carriage in accordance with pressure and humidity.

58. The combination with a centrifugal compressor having a volume governing mechanism which may be set to cause the compressor to handle a constant volume of fluid, of means for indicating the correct setting for the volume governing mechanism whereby the volume handled under any conditions of temperature, pressure, and humidity, will be equivalent in weight to a desired volume of gas referred to some standard conditions of temperature, pressure, and humidity, said means comprising a member having a scale thereon, a main indicating pointer which coöperates with such scale, a carriage for the pointer which is movable to directly move the pointer in accordance with temperature, means movable in accordance with pressure and humidity, and differential means through which the movements of said last named means are transmitted to the main indicating pointer.

59. The combination with a centrifugal compressor having a volume governing mechanism which may be set to cause the compressor to handle a constant volume of fluid, of means for indicating the correct setting for the volume governing mechanism whereby the volume handled under any conditions of temperature, pressure, and humidity, will be equivalent in weight to a desired volume of gas referred to some standard conditions of temperature, pressure, and humidity, said means comprising a member having a scale thereon, a main indicating pointer which coöperates with such scale, a carriage for the pointer which is movable to directly move the pointer in accordance with temperature, means movable in accordance with pressure and humidity, and a cam through which the movements of the said last named means are transmitted to the main indicating pointer.

60. The combination with a centrifugal compressor having a volume governing mechanism which may be set to cause the compressor to handle a constant volume of fluid, of means for indicating the correct setting for the volume governing mechanism whereby the volume handled under any conditions of temperature, pressure, and humidity, will be equivalent in weight to a desired volume of gas referred to some standard conditions of temperature, pressure, and humidity, said means comprising a carriage having a pointer fixed thereon, a temperature scale for it, a plate slidable on the carriage, a pointer pivoted on the carriage and connected to move the plate relative to the carriage, a barometer scale for it, a member slidable on the plate having a pointer, a barometer scale for it, a main indicating pointer carried by the carriage and slidable relative thereto, and means for transmitting movement from said plate and said member to the main indicating pointer.

In witness whereof I have hereunto set my hand this sixth day of December, 1916.

LOUIS C. LOEWENSTEIN.

It is hereby certified that in Letters Patent No. 1,313,099, granted August 12, 1919, upon the application of Louis C. Loewenstein, of Lynn, Massachusetts, for an improvement in "Volume-Correctors," errors appear in the printed specification requiring correction as follows: Page 6, line 88, for "$P_1T°$" read $P_2T°$; page 7, line 71, strike out the parenthesis and insert a comma; page 8, line 82, claim 16, after the word "means" insert the word *for;* and that the said Letters Patent should be read with these corrections therein that the same may conform to the record of the case in the Patent Office.

Signed and sealed this 16th day of September, A. D., 1919.

[SEAL.]

M. H. COULSTON,
*Acting Commissioner of Patents.*

Cl. 230—24.